(12) United States Patent
Franz, Jr.

(10) Patent No.: US 12,252,276 B2
(45) Date of Patent: Mar. 18, 2025

(54) PAYLOAD DELIVERY SYSTEMS FOR AERIAL VEHICLES

(71) Applicant: John David Franz, Jr., McAllen, TX (US)

(72) Inventor: John David Franz, Jr., McAllen, TX (US)

( * ) Notice: Subject to any disclaimer, the term of this patent is extended or adjusted under 35 U.S.C. 154(b) by 186 days.

(21) Appl. No.: 17/364,238

(22) Filed: Jun. 30, 2021

(65) Prior Publication Data
US 2023/0002052 A1    Jan. 5, 2023

(51) Int. Cl.
| B64D 1/12 | (2006.01) |
| B64C 39/02 | (2023.01) |
| B64U 10/13 | (2023.01) |
| B64U 101/60 | (2023.01) |
| B64U 101/67 | (2023.01) |

(52) U.S. Cl.
CPC ............ *B64U 10/13* (2023.01); *B64C 39/024* (2013.01); *B64D 1/12* (2013.01); *B64U 2101/67* (2023.01)

(58) Field of Classification Search
CPC ... B64D 1/22; B64D 1/12; B64D 1/08; B64D 1/02; B64D 9/00; B64D 25/06; B64C 2201/128; B64F 1/32; B64U 2101/60; A01K 27/003; B66C 1/38; B66C 1/12; B66C 1/16; B65G 9/004; A62B 1/00; A62B 2/00; A62B 5/00; A62B 99/00; A63B 29/00
USPC .................................................. 294/75, 82.4
See application file for complete search history.

(56) References Cited

U.S. PATENT DOCUMENTS

| 3,934,848 | A | * | 1/1976 | Snyder | B64D 17/32 244/151 A |
| 4,337,913 | A | * | 7/1982 | Booth | B64D 17/38 244/151 B |
| 4,923,150 | A | * | 5/1990 | Calkins | B64D 17/38 244/148 |
| 6,164,048 | A | * | 12/2000 | Rhodes | A01K 27/005 24/115 F |
| 6,382,139 | B1 | * | 5/2002 | Rhodes | B68C 1/00 119/776 |
| 6,983,913 | B2 | * | 1/2006 | Auvray | B64D 17/38 244/151 A |
| 9,676,487 | B1 | * | 6/2017 | Fox, Jr. | B64D 17/38 |
| 2002/0175246 | A1 | * | 11/2002 | Kurtgis | B64D 1/12 244/137.4 |
| 2004/0050343 | A1 | * | 3/2004 | Kurtgis | B64D 1/12 119/710 |
| 2009/0294594 | A1 | * | 12/2009 | Deazley | B64D 17/386 244/149 |
| 2011/0155857 | A1 | * | 6/2011 | Deazley | B64D 17/386 244/151 B |

(Continued)

*Primary Examiner* — Joshua J Michener
*Assistant Examiner* — Arfan Y. Sinaki
(74) *Attorney, Agent, or Firm* — Rothwell, Figg, Ernst & Manbeck, P.C.

(57) ABSTRACT

Systems and methods for delivering payloads are described. In some embodiments, a system may include a tether, a release wire, and a coupling. The system may have a first state and a second state. In the first state, a portion of the coupling may extend through an opening in the tether and engage the release wire. In the second state, the release wire may not engage the portion of the coupling such that the portion of the coupling can pass freely through the opening in the tether.

17 Claims, 8 Drawing Sheets

(56) References Cited

U.S. PATENT DOCUMENTS

| | | | |
|---|---|---|---|
| 2014/0097298 A1* | 4/2014 | Deazley | B64D 17/62 |
| | | | 244/149 |
| 2014/0097299 A1* | 4/2014 | Deazley | B64D 1/08 |
| | | | 244/149 |
| 2016/0150360 A1* | 5/2016 | Pope | H04W 4/02 |
| | | | 340/8.1 |
| 2021/0070454 A1* | 3/2021 | Lavender | F16B 1/02 |

* cited by examiner

PAYLOAD DELIVERY SYSTEMS FOR AERIAL VEHICLES

FIELD OF THE DISCLOSURE

This disclosure relates to systems and methods for delivering payloads from aerial vehicles. Specifically, this disclosure relates to systems and methods for automatically releasing a payload when a force is applied to a release mechanism.

BACKGROUND

Aerial vehicles, including but not limited to unmanned aerial vehicles such as drones, may be used to transport payloads to remote locations. For example, in rescue scenarios, it may be desirable to use an aerial vehicle to deliver a life vest or floatation device, a first aid kid, or other package to a person in need. In other cases, it may be desirable to deliver a payload, such as a delivery package, to a person or other delivery target. In still other cases, it may be desirable to deliver a payload, such as a sensor or antenna, in a remote location. For example, following natural disasters, workers may wish to deploy communications relays, cameras, or other sensors in locations that are dangerous or difficult to reach with human personnel.

Current payload delivery systems for small aerial vehicles generally involve mechanisms actuated by motors. In these systems, release of the payload is typically controlled by the operator of the vehicle, who activates the release mechanism. This makes the system less suitable for many applications. For example, in a water rescue scenario, a person who is being rescued should be able to grab the rescue package and cause it to be released, without requiring any action by the operator. Otherwise, there may be discoordination between the operator and the person being rescued, which may cause the payload to be released out of reach or the delivery vehicle to be pulled in to the water. There are many other applications where initiating release based on an external force being applied at a delivery location is desirable. For example, in a disaster scenario, an operator may wish to attach a payload to a specific structure. In systems where the operator must initiate a release mechanism, it is easy for the payload to miss its target. Conversely, if the payload releases automatically when the payload engages the target (e.g., via a magnet), successful deployment at the target can be assured.

Accordingly, there is a need for systems and methods that can deliver payloads in a way that is simple, reliable, and cost-effective. Further, there is a need for delivery systems and methods which can enable automated release upon engagement with a delivery target.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, a system for delivering a payload may be provided. The system may include a tether being configured to support a payload, a release wire arranged such that it does not support the weight of the payload when the payload is supported by the tether, and a coupling configured to releasably couple the tether to a delivery vehicle. In some embodiments, the system may have a first state and a second state. In the first state, the release wire may be in a first position, and a portion of the coupling may extend through an opening in the tether and engage the release wire such that the release wire in the first position holds the coupling in place and maintains the system in the first state. In the second state, the release wire may be in a second position in which the release wire does not engage the portion of the coupling, and the portion of the coupling may be configured to pass freely through the opening in the tether. The system may be configured such that, when the system is in the first state, moving the release wire from the first position to the second position may cause the system to transition from the first state to the second state. The system may be further configured such that, when the tether is coupled to a delivery vehicle by the coupling, transitioning the system from the first state to the second state may cause the tether to become released from the delivery vehicle.

In some embodiments, a method for delivering a payload may be provided. The method may include attaching a payload to a tether, wrapping a coupling around a portion of a delivery vehicle or an object secured to the delivery vehicle, the coupling being attached to the tether and configured to releasably couple the tether to the delivery vehicle, extending a portion of the coupling through an opening in a tether, and passing a release wire through the portion of the coupling, thereby securing the coupling in a first state in which the portion of the coupling extends through the opening in the tether and engages the release wire. In some embodiments, the release wire and the coupling may be arranged such that removing the release wire from the portion of the coupling causes the coupling to transition to a second state in which the portion of the coupling may pass freely through the opening, thereby releasing the tether from the delivery vehicle.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Figure 1:
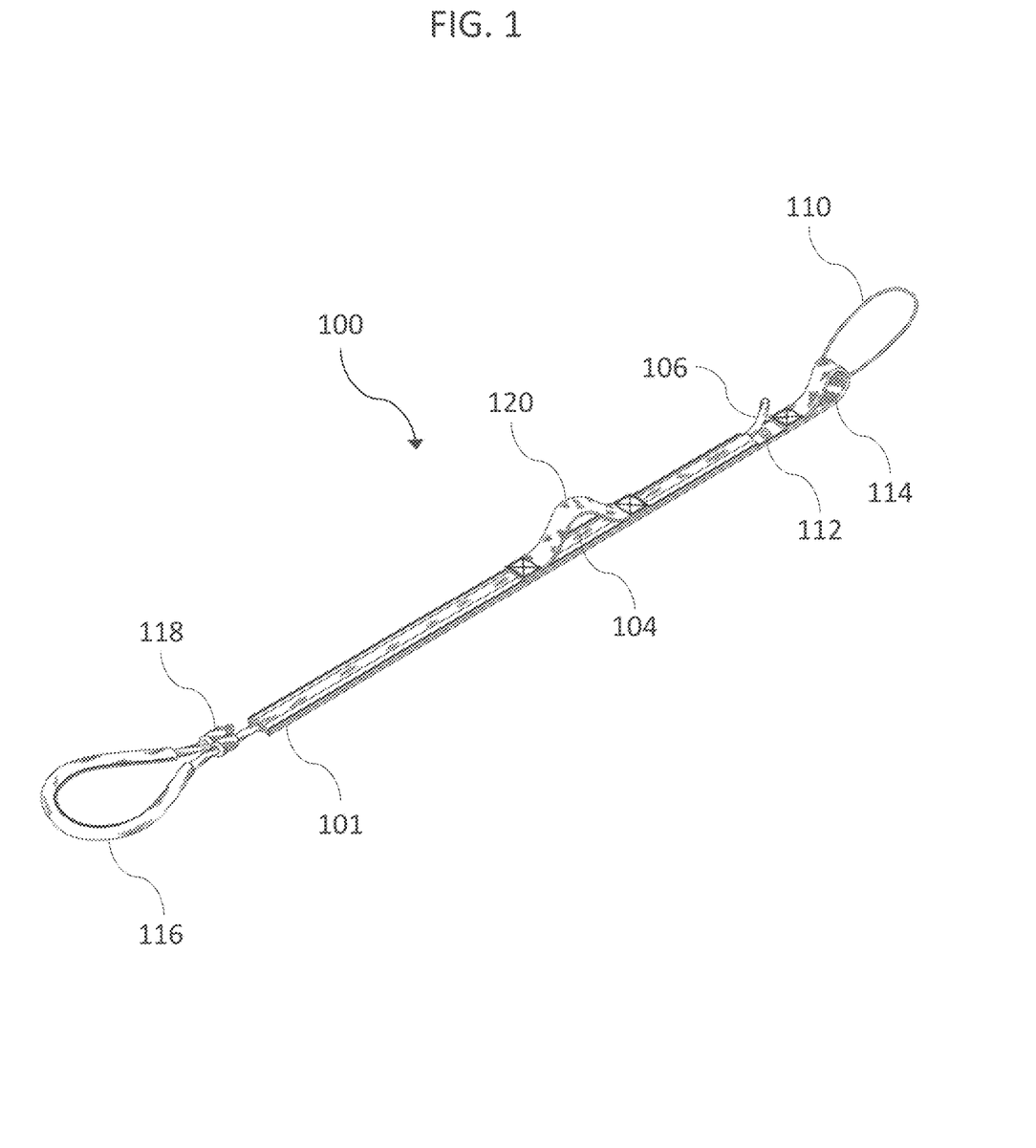
FIG. 1 illustrates an exemplary system for delivering payloads.

FIG. 1 shows an exemplary system 100 for delivering payloads. The system 100 may include a tether 101, a release wire 104, and a coupling 110. In some embodiments, the coupling 110 may be a loop of material, such as fiber, rope, or polymer. The coupling 110 may be attached to the tether by any suitable mechanism. In the illustrated embodiment, for example, a portion of the tether 101 is doubled back to form a slot 114 through which the coupling 110 extends.

In some embodiments, the coupling 110 may be configured to extend, at least in part, through an opening 112 in the tether. In some embodiments, the release wire 104 may include an engagement portion 106, which may be configured to engage a portion of the coupling 110 that passes through the opening 112. For example, the engagement portion 106 may be extend at an angle or be curved or hook-shaped, such that, when a portion of the coupling 110 extends through the opening 112 and engages the engagement portion 106, the portion of the coupling 110 will not readily disengage the engagement portion 106 unless the release wire 104 is withdrawn (as described below with respect to, e.g., FIGS. 3A-3B and 7A-7B). The release wire 104 may include or be attached to a handle 116. In some embodiments, the handle 116 and the engagement portion 106 may be disposed at opposite ends of the release wire 104. In some embodiments, a portion of the release wire 104 may be looped back and fastened with a fastener 118 to form the handle 116. In some embodiments, the release wire 104 may extend through a channel defined in the tether 101. In some embodiments, the release wire 104 may be configured to move independently from the tether 101. For example, the release wire 104 may be arranged to slide axially within the channel relative to the tether 101.

In some embodiments, the system may include a payload attachment portion 120. The payload attachment portion 120 may be configured to allow payloads to be securely attached to the system 100 by fastening the payload to the payload attachment portion 120. Any suitable attachment mechanism may be used. For example, a payload may be attached using a fastener, such as a clasp or carabiner. In some embodiments, the attachment portion may be a length of material that is attached to the tether to form a closed loop to which attachment mechanisms may be coupled.

Figure 2:
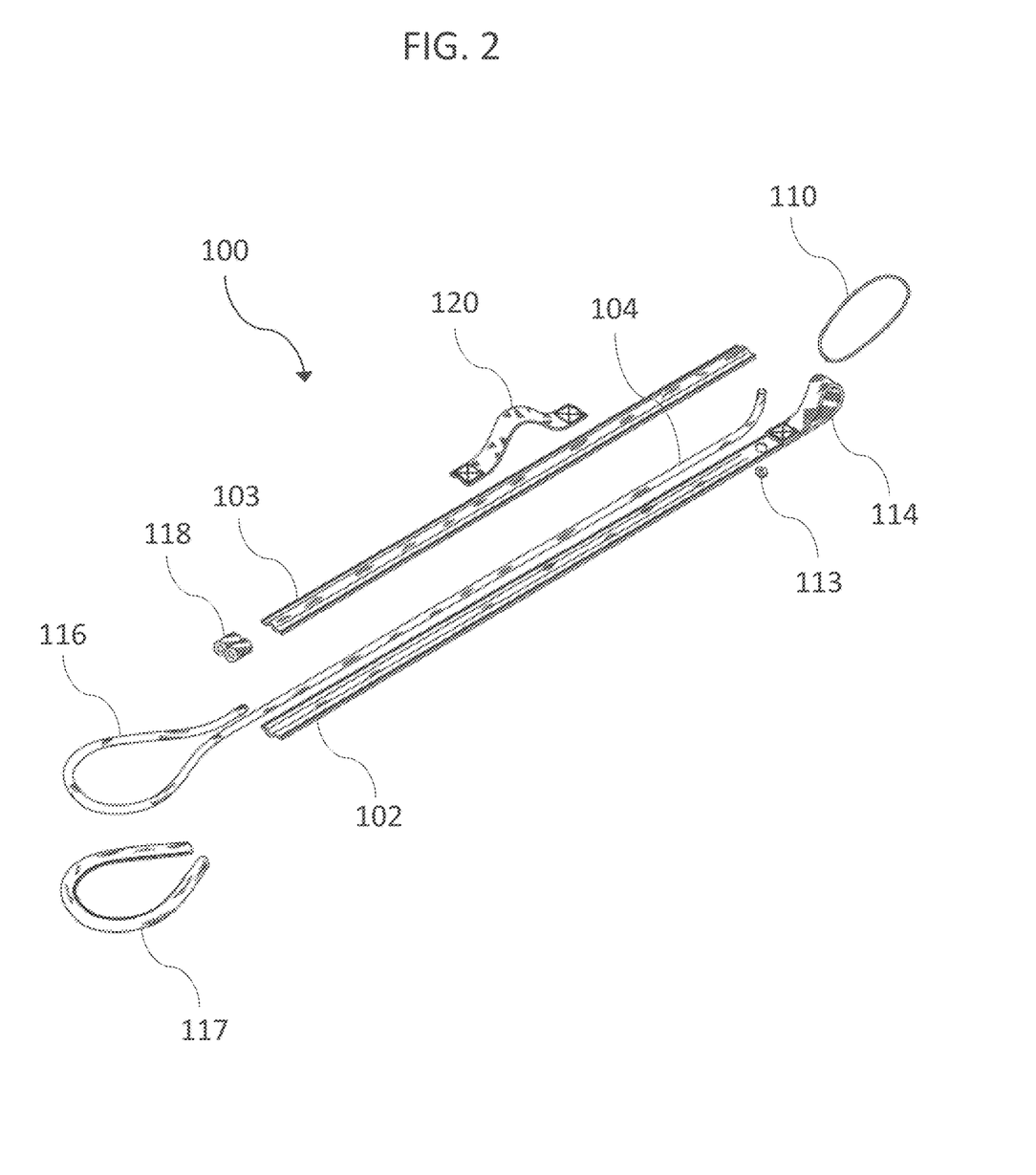
FIG. 2 shows an exploded view of the system of FIG. 1.

FIG. 2 shows an exploded view of the system 100 of FIG. 1. This view shows that an exemplary tether 101 may include a first tether portion 102 and a second tether portion 103, which may be attached to one-another to form a channel through which the release wire 104 may extend. As illustrated in FIG. 2, a bearing 113 may be placed within opening 112. This may advantageously reduce wear on the portion of the tether 101 surrounding the opening 112. In some embodiments, the handle 116 may include a cover 117, which may be made from a material suitable for being gripped by a human hand.

Figure 3A:
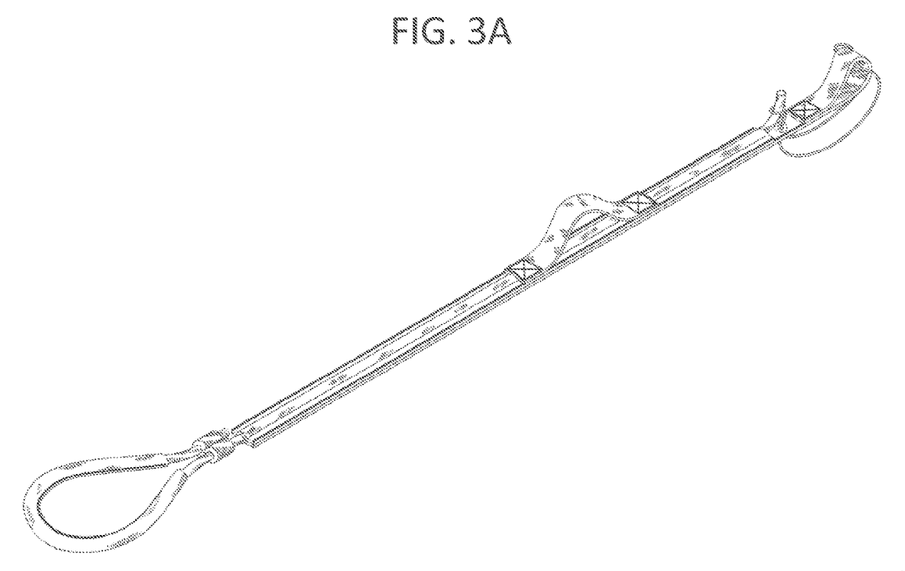
FIGS. 3A and 3B illustrate a transition of the system from a first state to a second state.
Figure 3B:
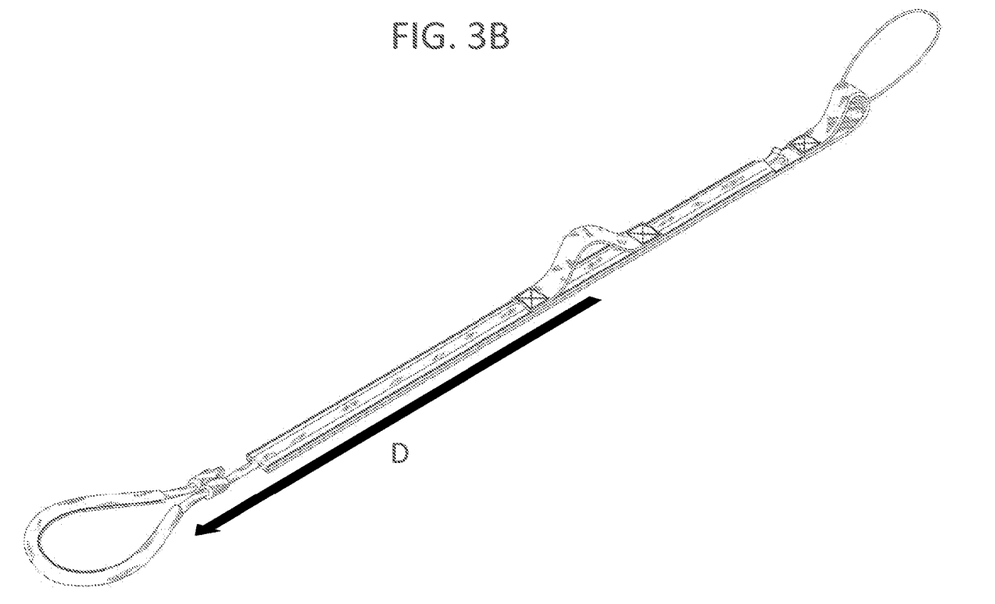

FIGS. 3A and 3B illustrate a transition of the system 100 from a first state (shown in FIG. 3A) to a second state (shown in FIG. 3B). As shown in FIG. 3A, when the system 100 is in the first state, the release wire 104 may be in a first position, and a portion of the coupling 110 may extend through the opening 112 in the tether and engage the release wire 104. The release wire 104 may hold the coupling 110 in place and thus maintain the system in the first state.

As shown in FIG. 3B, when the system 100 is in the second state, the release wire 104 may be in a second position in which the release wire 104 does not engage the portion of the coupling 110. In the second state, the portion of the coupling 110 may pass freely through the opening 112 in the tether 101.

In some embodiments, the system 101 may be transitioned from the first state to the second state by moving the release wire 104 from the first position to the second position. For example, when the system is in the first state, a tension force may be applied to the tether 101, for example, by pulling the handle 116, which may cause the release wire 104 to move relative to the tether in direction D. As a result, the release wire 104 may move from the first position to the second position, thus disengaging the coupling 110 and causing the system to transition from the first state to the second state. In some embodiments, the system may be attached to a delivery vehicle by wrapping the coupling 110 around a portion of the delivery vehicle or an object affixed thereto. In some embodiments, transitioning the system from the first state to the second state may release the coupling 110 from the delivery vehicle, thus releasing the system 100 and an accompanying payload from the delivery vehicle.

Figure 4:
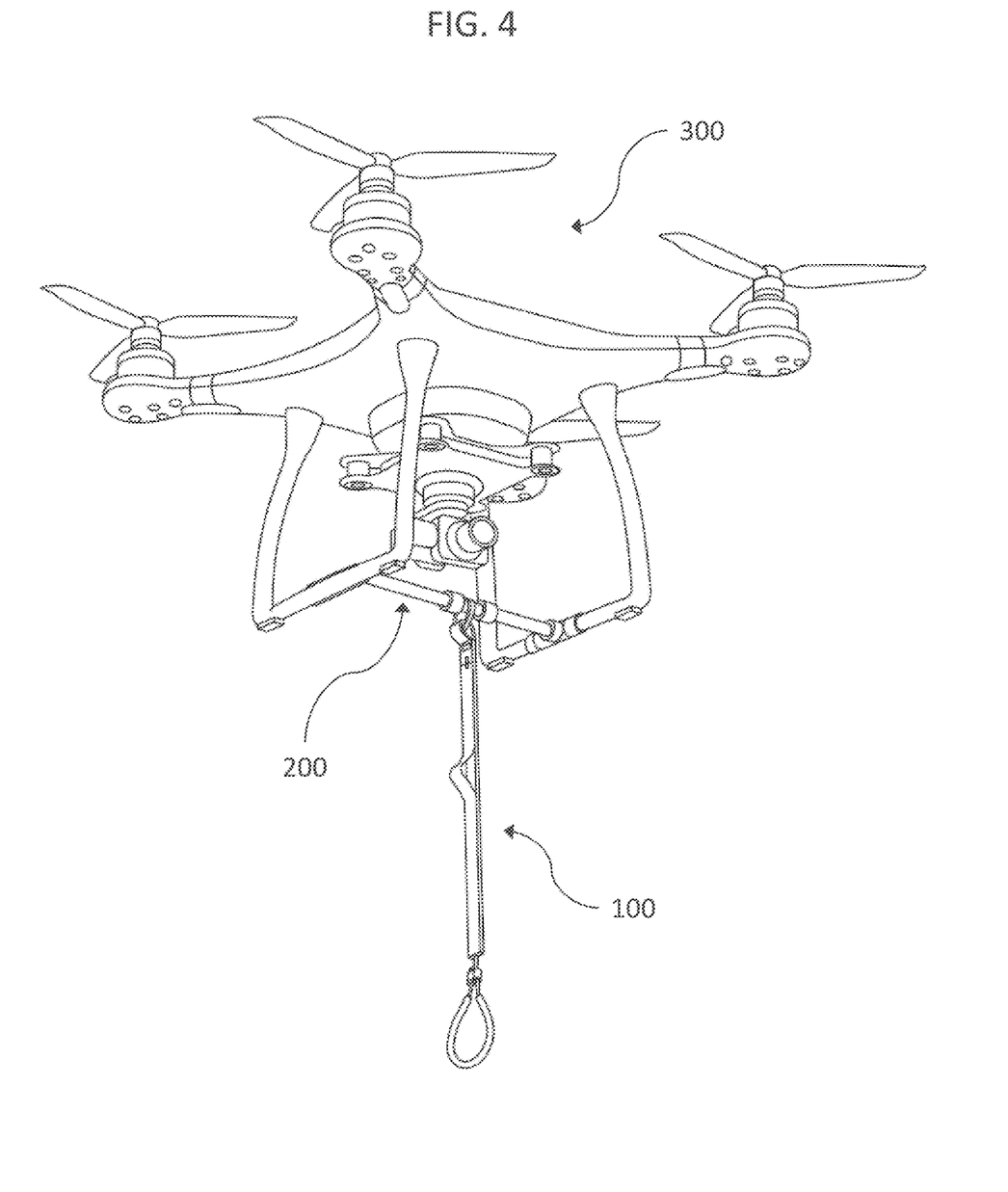
FIG. 4 shows an exemplary arrangement for attaching the system to a delivery vehicle.

FIG. 4 shows an exemplary arrangement for attaching the system 100 to a delivery vehicle 300. In some embodiments, the delivery vehicle may be an aerial vehicle. In some embodiments, the delivery vehicle may be an unmanned aerial vehicle or drone. In some embodiments, system 100 may be coupled to a bar or other attachment component 200 via any of the arrangement described herein (e.g., with respect to FIGS. 1-3 and 5-8). The attachment component 200 may be affixed to a portion of the delivery vehicle 300. For example, the attachment component 200 may be attached to a portion of the delivery vehicle 300 using snap fits, frictional engagement, ties, fasteners, or any other suitable arrangement.

Figure 5:
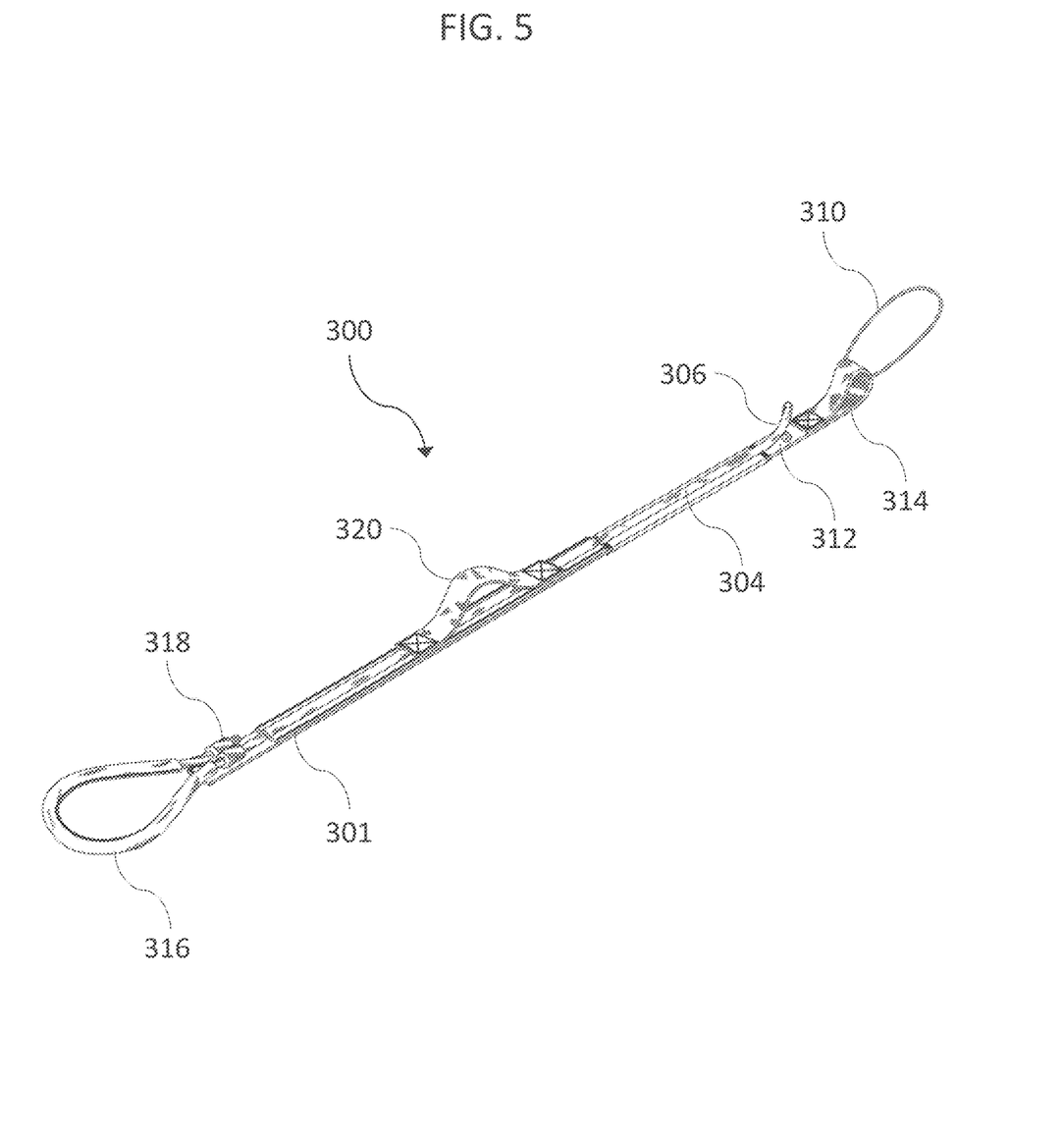
FIG. 5 shows another exemplary system for delivering payloads.

FIG. 5 shows another exemplary system 300 for delivering payloads. The system 300 shown in FIG. 5 generally has similar structure and functionality to the system 100 described above with respect to FIGS. 1-3, but the system 300 differs in its release mechanism. In some embodiments, system 300 may include a tether 301, a release wire 304, and a coupling 310. In some embodiments, the coupling 310 may be a loop of material, such as fiber, rope, or polymer. The coupling 310 may be attached to the tether by any suitable mechanism. In the illustrated embodiment, for example, a portion of the tether 301 is doubled back to form a slot 314 through which the coupling 110 extends.

In some embodiments, the coupling 310 may be configured to extend, at least in part, through an opening 312 in the tether. In some embodiments, the release wire 304 may include an engagement portion 306, which may be configured to engage a portion of the coupling 310 that passes through the opening 312. For example, the engagement portion 306 may be extend at an angle or be curved or hook-shaped, such that, when a portion of the coupling 310 extends through the opening 312 and engages the engagement portion 306, the portion of the coupling 310 will not readily disengage the engagement portion 306 unless the release wire 304 is withdrawn (as described with respect to, e.g., FIGS. 3A-3B and 7A-7B). The release wire 304 may include or be attached to a handle 316. In some embodiments, the handle 316 and the engagement portion 306 may be disposed at opposite ends of the release wire 304. In some embodiments, a portion of the release wire 304 may be looped back and fastened with a fastener 318 to form the handle 316. In some embodiments, the release wire 304 may extend through a channel defined in the tether 301. For example, the release wire 304 may be arranged to slide axially within the channel relative to at least a portion of the tether 301.

In some embodiments, the system may include a payload attachment portion 320. The payload attachment portion 320 may be configured to allow payloads to be securely attached to the system 300 by fastening the payload to the payload attachment portion 320. Any suitable attachment mechanism may be used. For example, a payload may be attached using a fastener, such as a clasp or carabiner. In some embodiments, the attachment portion may be a length of material that is attached to the tether to form a closed loop to which attachment mechanisms may be coupled.

Figure 6:
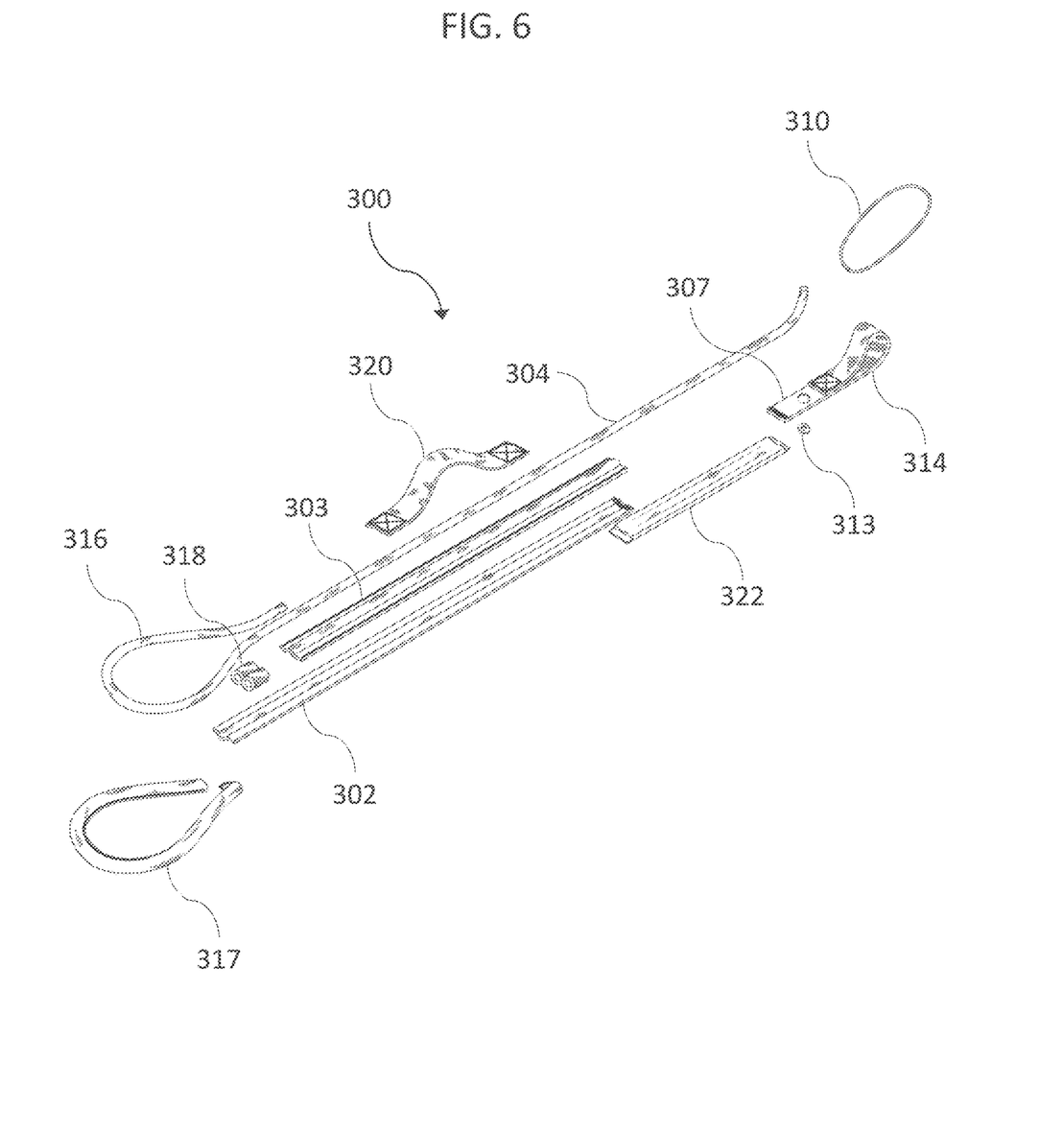
FIG. 6 shows an exploded view of the system of FIG. 5.

As shown in the exploded diagram of FIG. 6, the tether 301 of system 300 may include multiple portions. In some embodiments, the tether 301 may include a first tether portion 307, to which the coupling 310 may be affixed. The tether 301 may further include a second tether portion, to which the release wire 304 may be affixed. In some embodiments, the second tether portion may include two subparts 302, 303. In some embodiments, the second tether portion subparts 302, 303 may be attached (e.g., sewn) together to form a channel through which the release wire 304 may extend. In some embodiments, the tether 301 may further include an elastic tether portion 322, which may be disposed between the first tether portion 307 and the second tether portion 302, 303. An operation of the elastic tether portion 322 is described in greater detail below with respect to FIGS. 7A and 7B.

As illustrated in FIG. 6, a bearing 313 may be placed within opening 312. This may advantageously reduce wear on the portion of the tether 301 surrounding the opening 312. In some embodiments, the handle 316 may include a cover 317, which may be made from a material suitable for being gripped by a human hand.

Figure 7A:
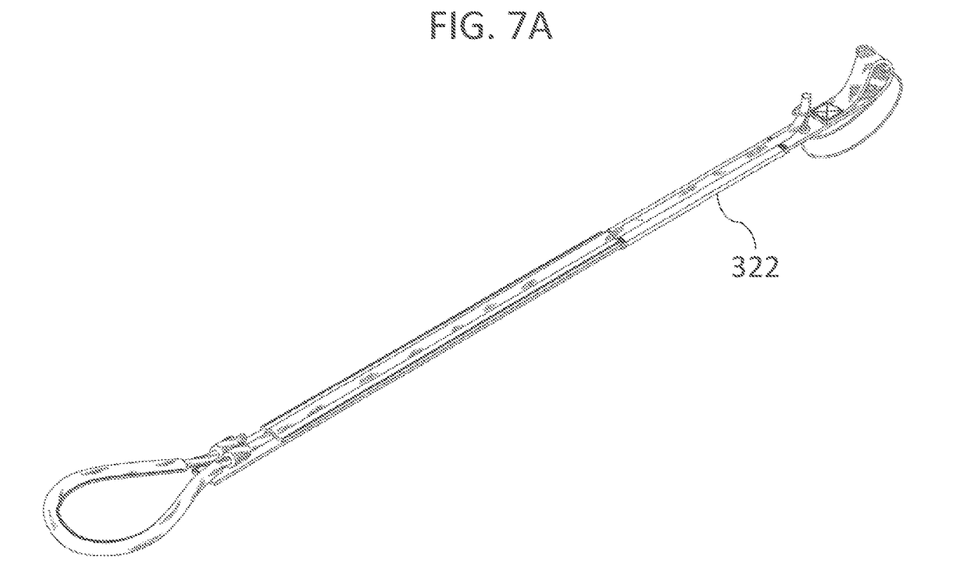
FIGS. 7A and 7B illustrate a transition of the system from a first state to a second state.
Figure 7B:
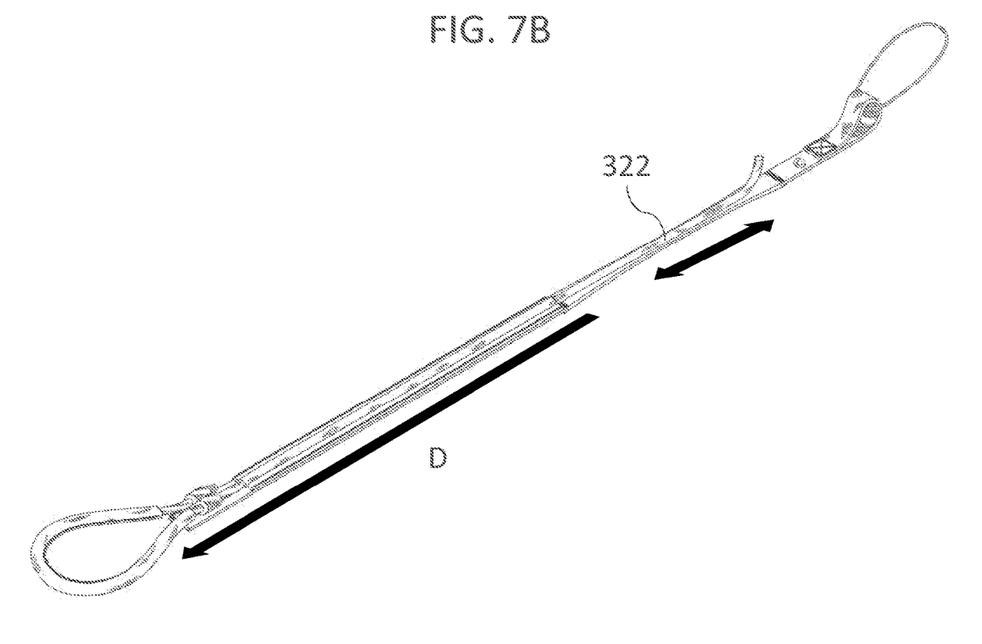

FIGS. 7A and 7B illustrate a transition of the system 300 from a first state (shown in FIG. 7A) to a second state (shown in FIG. 7B). As shown in FIG. 7A, when the system 300 is in the first state, the release wire 304 may be in a first position, and a portion of the coupling 310 may extend through the opening 312 in the tether and engage the release wire 304. The release wire 304 may hold the coupling 310 in place and thus maintain the system in the first state.

As shown in FIG. 7B, when the system 300 is in the second state, the release wire 304 may be in a second position in which the release wire 304 does not engage the portion of the coupling 310. In the second state, the portion of the coupling 310 may pass freely through the opening 312 in the tether 301.

In some embodiments, the system 301 may be transitioned from the first state to the second state by moving the release wire 304 from the first position to the second position. For example, when the system is in the first state, a tension force may be applied to the tether 301, for example, by pulling the handle 316. Applying a tension force to the tether 301 may cause the elastic portion to expand, such that a distance between the first tether portion 307 and the second tether portion 302, 303 is increased. As a result, the release wire 304 may be moved relative to the first tether portion 307 from the first position to the second portion, and the release wire 304 may be caused to disengage from the coupling. The system may thereby transition from the first state to the second state. As described above with respect to FIGS. 3A, 3B, and 4, this may cause the system 301 to be released from a delivery vehicle.

Although the embodiments illustrated in FIGS. 1-7 show handle mechanisms for applying tension to the tethers, any suitable mechanism may be used. Handles may be desirable where a person is available at the target location, such that the person may grasp the handle and actuate a release mechanism. In other cases, magnets, hooks, or other mechanisms may be used to engage an object at a target location. Once the object is engaged, the delivery vehicle may pull away from the object, thereby generating a tension force on the tether, which may actuate the release mechanism. Using magnets, hooks, and other engagement mechanisms may be desirable in disaster scenarios, such as hurricanes or nuclear meltdowns, where humans may not be available at the target location to initiate release of the payload.

Figure 8:
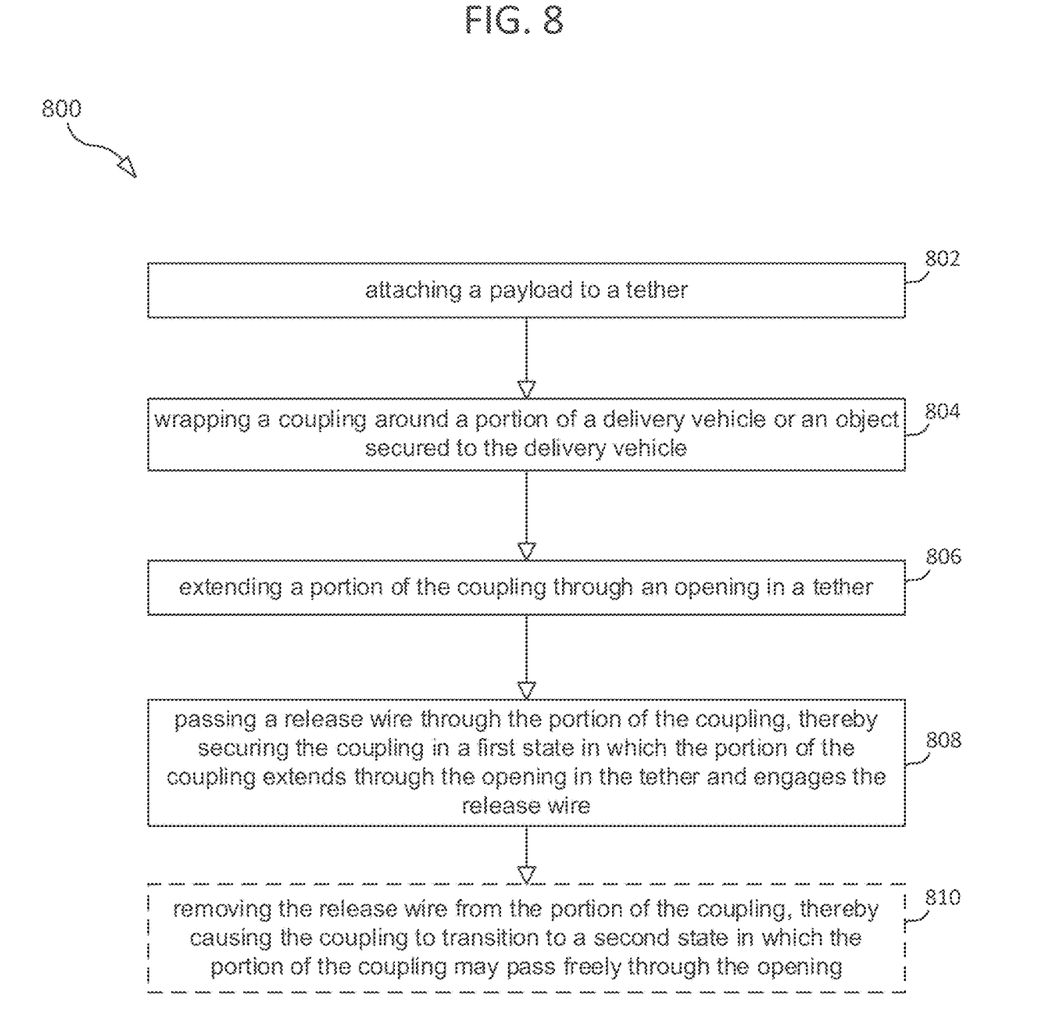
FIG. 8 shows an exemplary method for delivering a payload.

FIG. 8 shows an exemplary method 800 for delivering a payload. In step 802, a payload may be attached to a tether. For example, a payload (e.g., a floatation device, a first aid or medical kit, a package containing food or goods, a communication device, or any other object that may need to be delivered) may be attached to an attachment portion of the tether. The attachment may be made by any suitable mechanism, such as by tying or clasping the payload using, e.g., a carabiner. In step 804, a coupling may be wrapped around a portion of a delivery vehicle or an object secured to the delivery vehicle. An exemplary arrangement for wrapping a coupling around a portion of a delivery vehicle or an object secured thereto is shown in FIG. 4. The coupling may be attached to the tether and configured to releasably couple the tether to the delivery vehicle. In some embodiments, the delivery vehicle may be an aerial vehicle. In some embodiments, the delivery vehicle may be an unmanned aerial vehicle.

In step 806, a release wire may be passed through the portion of the coupling, thereby securing the coupling in a first state in which the portion of the coupling extends through the opening in the tether and engages the release wire. Upon completing step 808, the release wire and the coupling may be arranged such that removing the release wire from the portion of the coupling will cause the coupling to transition to a second state in which the portion of the coupling may pass freely through the opening. As discussed above with respect to FIGS. 3A-3B and 7A-7B, this may cause the tether to be released from the delivery vehicle. In some embodiments, method 800 may include step 810, in which the release wire may be released from the portion of the coupling, thereby causing the coupling to transition to the second state in which the portion of the coupling may pass freely through the opening, and the tether may be released from the delivery vehicle.

As discussed above with respect to FIGS. 3A-3B, moving the release wire from the first position to the second position may include moving the release wire relative to the tether, such as by sliding the release wire through a channel defined in the tether.

As discussed above with respect to FIGS. 5, 6, and 7A-7B, the tether may include a first portion to which the coupling is affixed, a second portion to which the release wire is affixed, and an elastic portion between the first portion and second portion. In some embodiments, optional step 810 may include applying a tension force to the tether, thereby causing the elastic portion to expand and the release wire to disengage from the coupling. This may result in the coupling transitioning from the first state to the second state, and the tether becoming released from the delivery vehicle.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for delivering a payload, the system comprising:
    a tether, the tether being configured to support a payload, wherein the tether comprises a first portion, a second portion, and an elastic portion between the first portion and second portion;
    a release wire comprising an engagement portion; and
    a coupling comprising a loop of material, the coupling being configured to releasably couple the tether to a delivery vehicle, wherein the coupling is affixed to the first portion of the tether and the release wire is affixed to the second portion of the tether;
    wherein:
        the system has a first state and a second state;
        in the first state, the release wire is in a first position, and a portion of the loop of material extends through an opening in the tether and engages the release wire by engaging the engagement portion of the release wire such that the release wire in the first position holds the coupling in place and maintains the system in the first state;
        in the second state, the release wire is in a second position in which the release wire does not engage the portion of the coupling, the portion of the coupling being configured to pass freely through the opening in the tether;
        the system is configured such that, when the system is in the first state, moving the release wire from the first position to the second position causes the system to transition from the first state to the second state;
        the system is configured such that, when the tether is coupled to a delivery vehicle by the coupling, transitioning the system from the first state to the second state causes the tether to become released from the delivery vehicle; and
        the system is configured such that applying a tension force to the tether causes the elastic portion of the tether to expand, thereby causing the system to transition from the first state to the second state.

2. The system of claim 1, wherein the release wire extends through a channel defined in the tether.

3. The system of claim 1, wherein the release wire is coupled to a handle, the system being arranged to transition from the first state to the second state when a tension force is applied to the handle.

4. The system of claim 3, wherein the handle and the coupling are disposed at opposite ends of the tether.

5. The system of claim 1, wherein a payload is attached to the tether.

6. The system of claim 1, wherein the system is attached to a delivery vehicle.

7. The system of claim 6, wherein the coupling is connected to a portion of the delivery vehicle or an object that is affixed, directly or indirectly, to the delivery vehicle and extends through the opening in the tether to engage the release wire, the system being in the first state.

8. The system of claim 6, wherein the delivery vehicle is an unmanned aerial vehicle.

9. The system of claim 1, wherein the release wire is configured to move independently from the tether.

10. A method for delivering a payload, the method comprising:
    attaching a payload to a tether;
    connecting a coupling to a portion of a delivery vehicle or an object secured to the delivery vehicle, the coupling comprising a loop of material being attached to the tether and configured to releasably couple the tether to the delivery vehicle;
    extending a portion of the loop of material through an opening in a tether; and
    engaging the portion of the loop of material around an engagement portion of a release wire, thereby securing the coupling in a first state in which the portion of the coupling extends through the opening in the tether and engages the release wire,
    wherein the release wire and the coupling are arranged such that removing the release wire from the portion of the coupling causes the coupling to transition to a second state in which the portion of the coupling is able to pass freely through the opening, thereby releasing the tether from the delivery vehicle, and
    wherein the tether comprises a first portion to which the coupling is affixed, a second portion to which the release wire is affixed, and an elastic portion between the first portion and second portion, the release wire and coupling being arranged such that applying a tension force to the tether causes the elastic portion to expand and the release wire to disengage from the coupling, the coupling thereby transitioning from the first state to the second state.

11. The method of claim 10, wherein the release wire extends through a channel defined in the tether.

12. The method of claim 10, wherein the release wire is coupled to a handle, the system being arranged to transition from the first state to the second state when a tension force is applied to the handle.

13. The method of claim 12, wherein the handle and the coupling are disposed at opposite ends of the tether.

14. The method of claim 10, wherein the delivery vehicle is an unmanned aerial vehicle.

15. The method of claim 10, wherein the method further comprises removing the release wire from the portion of the coupling, thereby causing the coupling to transition to the second state in which the portion of the coupling is able to pass freely through the opening.

16. The method of claim 10, wherein the release wire is configured to move independently from the tether.

17. The method of claim 10, further comprising the step of applying a tension force to the tether, thereby causing the elastic portion to expand and the release wire to disengage from the coupling, the coupling thereby transitioning from the first state to the second state.

* * * * *